United States Patent [19]

Pavlushkin et al.

[11] 4,055,436
[45] Oct. 25, 1977

[54] GLASS FOR MANUFACTURING WHITE-COLORED GLASS-CRYSTALLINE MATERIAL

[76] Inventors: Nikolai Mikheevich Pavlushkin, ulitsa Gotvalda, 20, kv. 15; Konstantin Timofeevich Bondarev, Nizhne-Pervomaiskaya ulitsa, 33, kv. 171, both of Moscow; Anatoly Vasilievich Strekalov, ulitsa Shmidta, 31, kv. 12, Konstantinovka Donetskoi oblasti; Viktor Stepanovich Kozlovsky, ulitsa Teatralnaya, 6a, Dolgoprudny Moskovskoi oblasti; Anatoly Gavrilovich Minakov, ulitsa Levanevakogo, 18, kv. 11; Tamara Efimovna Golius, ulitsa Pushkinskaya, 18, kv. 11, both of Konstantinovka Donetskoi oblasti; Ljudmila Alexeevna Orlova, ulitsa Kibalchicha, 2, korpus 3, kv. 20; Pavel Dzhibraelovich Sarkisov, ulitsa Gotvalda, 20, kv. 3, both of Moscow; Mikhail Ivanovich Kozmin, ulitsa Shmidta, 31, kv. 6; Vladimir Anatolievich Minakov, ulitsa Shmidta, 31, kv. 14, both of Konstantinovka Donetskoi oblasti, all of U.S.S.R.

[21] Appl. No.: 713,896

[22] Filed: Aug. 12, 1976

Related U.S. Application Data

[63] Continuation of Ser. No. 599,601, July 28, 1975, abandoned, which is a continuation of Ser. No. 139,465, May 3, 1971, abandoned.

[51] Int. Cl.$^2$ .......................... C03C 3/04; C03C 3/22
[52] U.S. Cl. ...................................... 106/52; 106/39.6
[58] Field of Search ................... 106/57, 117, 39.6, 52; 65/19

[56] References Cited

U.S. PATENT DOCUMENTS 3,170,780  2/1965  Takehara et al. .................... 106/39.6

FOREIGN PATENT DOCUMENTS 820,981    8/1969  Canada .............................. 106/39.6
4,015,508  3/1962  Japan ............................... 106/39.6

OTHER PUBLICATIONS

Kingeny; W. D., Introduction to Ceramics, John Wiley & Sons, Inc., New York, 1967, 4th Printing, p. 576.
Morey; G. W., The Properties of Glass, Reinhold Publishing Corp., p. 160, 1954.

Primary Examiner—Winston A. Douglas
Assistant Examiner—Mark Bell
Attorney, Agent, or Firm—Holman & Stearn

[57] ABSTRACT

Glass characterized by the introduction into its composition of $K_2O$ amount to 4 to 7% by weight, in place of $Na_2O$. Such glass has an increased viscosity at the crystallization temperatures enabling the use of continuous production techniques without distortion of the resultant band.

1 Claim, 1 Drawing Figure

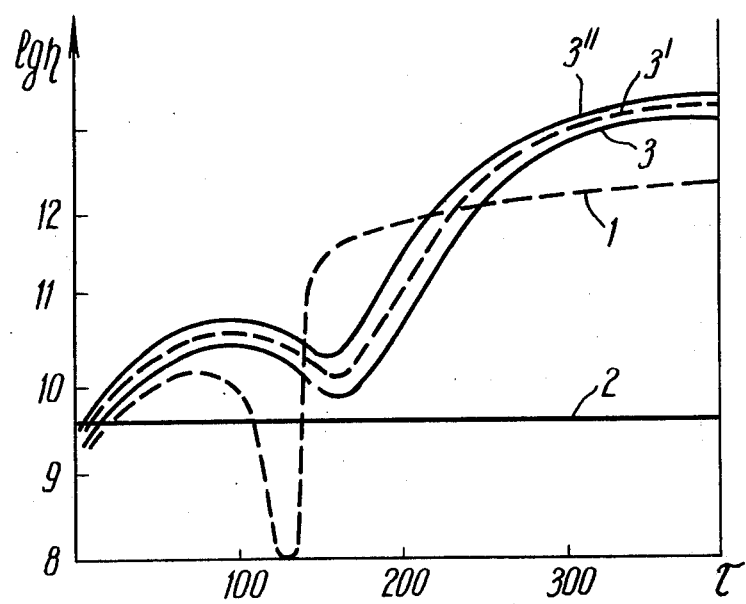

GLASS FOR MANUFACTURING WHITE-COLORED GLASS-CRYSTALLINE MATERIAL

This is a continuation of application Ser. No. 599,601 filed July 28, 1975, which in turn is a continuation of Ser. No. 139,465 filed May 3, 1971, both of which are now abandoned.

The present invention relates to compositions of glass or manufacturing white glass-crystalline material by using metallurgical slag as a raw material.

The glass-base glass-crystalline material is a promising stock which finds a wide variety of use in different fields of national economy and civil and industrial construction, in particular, because it combines valuable physicochemical properties. Thus, in addition to possessing such characteristics as high water tightness and chemical stability, considerable mechanical strength and abrasive resistance, the material is capable of meeting architectural and decorative (aesthetic) requirements as well.

A combination of dark- and bright-colored glass-crystalline materials is considered most effective for decorative purposes. Therefore the possibility of fabricating white-colored glass-crystalline material is currently of prime importance.

To date plate dark-colored glass-crystalline material is manufactured on an industrial scale by the application of a continuous rolling process. A glass band up to 1600 mm wide and from 8 to 12 mm thick produced on a rolling mill is then subjected to heat treatment to achieve directional crystallization in a natural gas-heated lehr through which the glass band is conveyed on metal rolls.

BACKGROUND OF THE INVENTION

In implementing the technology of production of white plate glass-crystalline material from glasses of the known compositions, difficulties may be encountered related to both distortion of the band in the course of crystallization and its sagging between the conveying rolls of a roll table.

The known glass compositions for the fabrication of the white glass-crystalline material are given in the Table below.

tion, acting as a crystallization catalyst and aiding in the production of the white-colored glass-crystalline material. The introduction of fluorides is needed for reducing the temperature at which crystallization is initiated.

In manufacturing glass-crystalline material great importance must be attributed to the viscosity characteristics of the glass employed as a base-material. The minimum viscosity value in crystallizing the above glasses amounts to $10^{8.0}$ poises, which is well below the conventional boundary of deformation, determined experimentally and corresponding to a viscosity of $10^{9.5}$ poises.

Such a low viscosity of the glass ensures crystallization of the pieces produced, which is likely to preserve their geometric configuration and linear parameters, provided only a continuous solid support is employed, but the low viscosity does not allow the production of the plate material by using a continuous rolling process. This is attributable to the fact that the viscosity values of the glasses subjected to crystallization during continuous rolling shall be in excess of $10^{9.5}$ poises, otherwise the glass band will be distorted due to sticking to the table rolls in the lehr or sagging between them.

SUMMARY OF THE INVENTION

It is an object of the present invention to design a glass for the fabrication of a white-colored glass-crystalline material, featuring higher viscosity in the crystallization interval of temperatures, which will make possible the production of plate material through the use of continuous mechanized rolling.

The above and other objects are achieved by using a glass for manufacturing a white glass-crystalline material of the following composition (per cent, by weight):

$SiO_2$ — 48–60
$Al_2O_3$ — 5–8
$CaO$ — 20–30
$MgO$ — 0.8–2.5
$MnO$ — 0.5–1.5
$Fe_2O_3$ — 0.1–1
$TiO_2$ — 0.2–0.5
$F_2$ — 0.5–2 and ZnS, with the glass composition, conforming to this invention, including also from 4 to 7% by weight of $K_2O$. The ZnS content in the proposed glass may be

Table

| Composition No. | $SiO_2$ | $Al_2O_3$ | $CaO$ | $MgO$ | $Na_2O$ | $MnO$ | $S^2$ | $F_2$ | $ZnO$ | $Zns$ | $Fe_2O_3$ | Reducer |
|---|---|---|---|---|---|---|---|---|---|---|---|---|
| I | 40–70 | 5–17 | 15–45 | — | 2–10 | 0.2–1 | 0.2–2 | 2 and less | — or ZnO+S | 2–5 | — | — |
| II | 40–60 | 5–15 | 25–35 | — | 0.5–8 | — | — | 3±0.5 | 2±0.5 | — | — | — |
| III | 40–70 | 5–12 | 20–38 | — | 3–8 | — | — | 0–2 | — or ZnO+S | 1–5 | — | 0–3 |
| IV | 40–63.5 | 5–15 | 25–35 | 0.1–3.5 | 0.5–8 | 0.1–1.5 | 0.2–0.8 | 0.5–6.5 | 0.5–3.5 | — | 0.1–1 | — |

See Japanese patent No. 15508, (composition I), Inventor's Certificate of the USSR No. 201,608, (composition II), U.S. Pat. No. 3,170,780 (composition III) and Inventor's Certificate of the USSR No. 270,219 (composition IV).

The foregoing compositions are basically similar, their major components being CaO, $Al_2O_3$, and $SiO_2$. Present in all of the compositions is zinc sulfide or a combination of ZnO+S which perform a double funcbelow 1% by weight.

The glass may also contain up to 1.5% by weight of $Na_2O$, however, it is not mandatory, being stipulated only by the use of sodium-containing raw materials (blast furnace slag and sodium fluosilicate).

The essence of the present invention resides in replacing sodium oxide present to date in all the known glass compositions (see the Table) by potassium oxide. The introduction of $K_2O$ contributes to an increase of up to $10^{9.5-10}$ poises in the glass minimum viscosity value within the crystallization interval.

BRIEF DESCRIPTION OF THE DRAWING

The accompanying drawing is a diagram showing variation of glass melt viscosity with crystallization time.

DETAILED DESCRIPTION OF PREFERRED EMBODIMENT

In the diagram the logarithm of coefficient of viscosity ($\eta$ in poise) is shown versus crystallization time.

Changes in viscosity in the course of crystallization of the known glass compositions (see the Table) are illustrated by curve 1. Straight line 2 in the drawing represents the conventional boundary of deformation which corresponds to a viscosity of $10^{9.5}$ poises. Curves 3,3' and 3'' represent the changes in viscosity for the proposed glass compositions set forth in Examples 1, 2 and 3 respectively.

As shown in the diagram the minimum viscosity value for the known glass compositions (curve 1) is well below the conventional boundary of deformation (straight line 2) while the minimum viscosities of the proposed glass compositions (curves 3,3' and 3'') are above the conventional boundary of deformation.

The positive effect of $K_2O$ on the process of crystallization of slag glass lies in the following:

As compared to $Na_2O$, $K_2O$ tends to increase glass viscosity in the range of crystallization temperatures. This results from the fact that the coordination number of sodium cations in the glass is equal to 6, while for potassium it is equal to 9. As the size and coordination number of a cation augment the degree of polymerization of oxysilicon groupings, combining with the metal cations is liable to increase as well. That is why when converting from sodium to potassium glasses the latter are prone to have a higher viscosity number.

$K_2O$ tends to reduce the temperature differential between the beginning of crystallization of the base phase and the softening point of the glass by increasing the latter.

$K_2O$ promotes the most active participation of fluorine ions in producing a well developed liquation structure featuring a large number of microphases which act as crystallization nuclei. The latter will allow the reduction in the content of the major catalyst, zinc sulfide — to less than 1% while in the glasses containing sodium oxide it proves to be insufficiently efficient, even when present in larger amounts, exceeding 1%.

All the foregoing offers an ample possibility for achieving directional crystallization of a continuous band on a roll table of a lehr without sagging, humping, curling and sticking to the rolls.

The substitution of potassium oxide for sodium oxide in the proposed glasses ensured crystallization of the travelling band featuring sufficiently high viscosity characteristics and ruled out band distortion.

The proposed glass composition allowed the fabrication on a production scale of a white-colored glass-crystalline material by the application of in-line mechanized production techniques.

The technology of manufacturing the plate glass-crystalline material by using the glass of the proposed composition provides for a continuous process. The glass is melted in continuous tanks.

The glass band is produced on a glass forming machine. After rolling, the band is passed to a lehr where it is heat-treated.

Peculiar to the crystallized pieces are a fine-grained structure, a white color and high physicochemical properties.

To make the essence of the present invention more fully apparent, given below are exemplary compositions of the proposed glass.

EXAMPLE 1

A glass contained (per cent, by weight):

$SiO_2$ — 60
$Al_2O_3$ — 5.7
$CaO$ — 20
$MgO$ — 2.37
$MnO$ — 1.6
$TiO_2$ — 0.2
$Fe_2O_3$ — 0.13
$Na_2O$ — 1.0
$F_2$ — 1.1
$K_2O$ — 7
$ZnS$ — 0.9

This glass was produced by melting together mixed raw materials made up of the following constituents (parts, by weight):

metallurgical slag — 47.5
silica sand — 43.0
potassium carbonate — 11.0
zinc oxide — 1.8
sodium fluosilicate — 2.0

The batch was melted in a glass melting furnace at a temperature of $1480° \pm 10°$ C and upon degassing was cooled to a refining temperature of 1350° C at which a continuous band 1600 mm wide and 10 mm thick was formed by rolling. Upon leaving the forming machine, the band was passed to a tunnel lehr. The maximum temperature of crystallization is equal to 950° C. As to the glass viscosity characteristics, they were as follows:

in melting — 50 poises, in refining — 500 poises. Changes in viscosity in the course of crystallization are shown by curve 3 on the accompanying chart. The minimum viscosity value during crystallization was $10^{9.8}$ poises.

The white-colored glass-crystalline material produced had the following properties:

density, g/cm$^3$ — 2.65
coefficient of linear expansion, 1/deg — 75
softening point, deg.C — 970
bending strength, kg/cm$^2$ — 800
abrasive factor, g/cm$^2$ — 0.0008
microhardness, kg/mm$^2$ — 700
thermal stability, deg C — 160
acid resistance, per cent — 99
alkali resistance, per cent — 90

EXAMPLE 2

A glass contained (per cent, by weight):

$SiO_2$ — 54.6
$Al_2O_3$ — 6.9
$CaO$ — 24.6
$MgO$ — 2.52

MnO — 1.38
Fe$_2$O$_3$ — 0.15
TiO$_2$ — 0.25
Na$_2$O — 1.3
F$_2$ — 1.5
K$_2$O — 6
ZnS — 0.8

This glass was produced by melting mixed raw materials made up of the following components (parts, by weight):

metallurgical slag — 58
silica sand — 33.8
potassium carbonate — 5.6
zinc oxide — 1.6
sodium fluosilicate — 2.75

The fabrication of glass-crystalline pieces was accomplished in compliance with Example 1 differing only in technological characteristics. Thus, the glass melting operation was at 1500° C, refining temperature — 1320° C, crystallizing (maximum) temperature — 920° C. Viscosity of the glass melt during the melting process was 20 poises, and during refining — 600 poises, during crystallization (minimum) $10^{10.5}$ poises.

The properties of the glass-crystalline material based on the above glass were in essence similar to those cited in Example 1.

EXAMPLE 3

A glass contained (per cent, by weight):

SiO$_2$ — 48.51
Al$_2$O$_3$ — 8.0
CaO — 30
MgO — 3.1
MnO — 1.7
Fe$_2$O$_3$ — 0.19
TiO$_2$ — 0.3
Na$_2$O — 1.5
F$_2$ — 2
K$_2$O — 4.0
ZnS — 0.70

The batch (charge) for producing this composition contained the following components (parts, by weight):

metallurgical slag — 71.0
silica sand — 23.0
potassium carbonate — 5.8
zinc oxide — 1.4
sodium fluosilicate — 3.7

The process of manufacturing glass-crystalline pieces was carried out in accordance with the technology of Example 1.

The fabricated material was similar, as far as its technological and physicochemical parameters were concerned, to those quoted in the preceding examples.

We claim:

1. A glass for manufacturing white-colored glass-crystalline material, consisting essentially of, in per cent by weight:

SiO$_2$ 48–60
Al$_2$O$_3$ 5–8
CaO 20–30
MgO 0.8–2.5
MnO 0.5–1.5
Fe$_2$O$_3$ 0.1–1
TiO$_2$ 0.2–0.5
F$_2$ 0.5–2
K$_2$O 4–7
Na$_2$O up to 1.5 and
ZnS less than 1.

* * * * *